US008093562B2

(12) United States Patent
Yokoyama et al.

(10) Patent No.: US 8,093,562 B2
(45) Date of Patent: Jan. 10, 2012

(54) RADIATION IMAGING APPARATUS, RADIATION IMAGING SYSTEM, AND CORRECTION METHOD

(75) Inventors: Keigo Yokoyama, Honjo (JP); Tadao Endo, Honjo (JP); Toshio Kameshima, Kumagaya (JP); Tomoyuki Yagi, Honjo (JP); Katsuro Takenaka, Kodama-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/748,004

(22) Filed: Mar. 26, 2010

(65) Prior Publication Data
US 2010/0176285 A1    Jul. 15, 2010

Related U.S. Application Data

(62) Division of application No. 11/608,083, filed on Dec. 7, 2006, now Pat. No. 7,732,778.

(30) Foreign Application Priority Data

Dec. 13, 2005  (JP) ................................ 2005-359480
Nov. 24, 2006  (JP) ................................ 2006-317189

(51) Int. Cl.
*G01T 1/24*    (2006.01)
(52) U.S. Cl. .................................................. 250/370.08
(58) Field of Classification Search ............... 250/252.1, 250/370.08; 378/44, 98
See application file for complete search history.

(56) References Cited

U.S. PATENT DOCUMENTS

| 5,905,772 A | 5/1999 | Rutten et al. ................. 378/98.8 |
| 6,828,539 B1 | 12/2004 | Kuwabara ................. 250/208.1 |
| 6,952,015 B2 | 10/2005 | Kameshima ............. 250/370.11 |
| 6,952,464 B2 | 10/2005 | Endo .......................... 378/98.11 |
| 6,985,555 B2 | 1/2006 | Endo .......................... 378/98.11 |
| 7,002,157 B2 | 2/2006 | Kameshima ............. 250/370.11 |
| 7,012,260 B2 | 3/2006 | Endo ........................ 250/370.11 |
| 7,138,639 B2 | 11/2006 | Kameshima ............. 250/370.11 |
| 7,154,099 B2 | 12/2006 | Endo ........................ 250/370.11 |
| 7,227,926 B2 | 6/2007 | Kameshima et al. ........ 378/98.9 |
| 7,408,167 B2 | 8/2008 | Kameshima et al. ..... 250/370.09 |
| 7,421,063 B2 | 9/2008 | Takenaka et al. ............ 378/116 |
| 7,476,027 B2 | 1/2009 | Takenaka et al. ............ 378/207 |

(Continued)

FOREIGN PATENT DOCUMENTS

JP    2004-033659    2/2004

(Continued)

OTHER PUBLICATIONS

Office Action issued Aug. 23, 2011 by the Japanese Patent Office in counterpart application 2006-317189, with translation.

*Primary Examiner* — David Porta
*Assistant Examiner* — Marcus Taningco
(74) *Attorney, Agent, or Firm* — Fitzpatrick, Cella, Harper & Scinto

(57) ABSTRACT

The invention intends to be able to perform a gain correction fully adequately. Hence, at the time of radiographing an object, a gain correction of the object image is performed based on a gain correction image (XRc1) derived by performing a light reset. On the other hand, at the time of radiographing an object, when a light reset is not performed, a gain correction of the object image is performed based on a gain correction image (XRc2) derived without performing the light reset.

1 Claim, 8 Drawing Sheets

U.S. PATENT DOCUMENTS

| | | | |
|---|---|---|---|
| 7,514,663 B2 | 4/2009 | Yagi et al. | 250/208.1 |
| 7,550,733 B2 | 6/2009 | Endo et al. | 250/370.09 |
| 7,564,038 B2 | 7/2009 | Endo | 250/370.11 |
| 7,629,587 B2 | 12/2009 | Yagi et al. | 250/370.15 |
| 2002/0024017 A1 | 2/2002 | Overdick et al. | 250/370.11 |
| 2003/0076922 A1* | 4/2003 | Wischmann et al. | 378/19 |
| 2005/0092909 A1* | 5/2005 | Spahn | 250/252.1 |
| 2005/0109927 A1 | 5/2005 | Takenaka et al. | 250/252.1 |
| 2005/0199834 A1 | 9/2005 | Takenaka et al. | 250/580 |
| 2005/0200720 A1 | 9/2005 | Kameshima et al. | 348/220.1 |
| 2005/0220269 A1 | 10/2005 | Endo et al. | 378/114 |
| 2005/0264665 A1 | 12/2005 | Endo et al. | 348/308 |
| 2006/0119719 A1 | 6/2006 | Kameshima | 348/308 |
| 2006/0192130 A1 | 8/2006 | Yagi | 250/370.14 |
| 2006/0289774 A1 | 12/2006 | Endo et al. | 250/370.09 |
| 2007/0040099 A1 | 2/2007 | Yokoyama et al. | 250/208.1 |
| 2007/0069144 A1 | 3/2007 | Kameshima | 250/370.09 |
| 2007/0080299 A1 | 4/2007 | Endo et al. | 250/370.09 |
| 2007/0096032 A1 | 5/2007 | Yagi et al. | 250/370.11 |
| 2007/0125952 A1 | 6/2007 | Endo et al. | 250/369 |
| 2007/0131843 A1 | 6/2007 | Yokoyama et al. | 250/205 |
| 2007/0183573 A1 | 8/2007 | Kameshima et al. | 378/98.9 |
| 2007/0210258 A1 | 9/2007 | Endo et al. | 250/370.09 |
| 2008/0013686 A1 | 1/2008 | Kameshima et al. | 378/98.12 |
| 2008/0054182 A1 | 3/2008 | Yokoyama et al. | 250/370.09 |
| 2009/0294679 A1 | 12/2009 | Yagi et al. | 250/370.09 |
| 2010/0046711 A1 | 2/2010 | Kameshima et al. | 378/98.8 |

FOREIGN PATENT DOCUMENTS

JP     2005-303586     10/2005

* cited by examiner

RADIATION IMAGING APPARATUS, RADIATION IMAGING SYSTEM, AND CORRECTION METHOD

RELATED APPLICATIONS

This application is a divisional of U.S. patent Ser. No. 11/608,083, filed Dec. 7, 2006, claims benefit of the filing date of that application under 35 U.S.C. §120, and claims priority benefit under 35 U.S.C. §119 of Japanese patent applications nos. 2005-359480, filed Dec. 13, 2005, and 2006-317189, filed Nov. 24, 2006. The entire contents of each of the mentioned prior applications is incorporated herein by reference.

BACKGROUND OF THE INVENTION

1. Field of the Invention

The present invention relates to a radiation imaging apparatus, a radiation imaging system, and a correction method of an image, and in particular, it is suitable for use to correct the data of an image.

2. Description of the Related Art

In recent years, demand for digitalization of X-ray images radiographed in hospitals has been on the increase. Hence, in place of the X-ray imaging apparatus that performs radiographing based on a film, a flat digital X-ray imaging apparatus (flat panel detector: hereinafter referred to as an "FPD") has begun to be used. The FPD is an apparatus that converts radiation into an electrical signal based on a plurality of radiation detecting elements disposed in a two-dimensional array pattern. The radiation detecting element mainly uses a non-monocrystalline semiconductor such as amorphous silicon (hereunder referred to as a-Si) capable of being formed into a large area detector. Such an FPD has a sensor unit including a plurality of pixels each having a photoelectric conversion element and an indirect radiation imaging apparatus having a wavelength conversion element such as a phosphor that converts the X-rays into light of a waveband perceptible by the photoelectric conversion elements. Further, there exists also a direct type radiation imaging apparatus having a sensor unit including a plurality of elements that directly convert the X-rays into an electrical signal.

The material a-Si can be fabricated into a thin glass below 1 mm in thickness. Hence, a-Si has the advantage of being able to make thickness extremely thin as a sensor. Moreover, the FPD using a-Si as the radiation detecting element is different from an X-ray imaging apparatus that performs radiographing based on a film, and can radiograph both still images and moving images using just one apparatus. Such an FPD which is used for radiographing both still images and moving images has already been put to practical use. From now on, the FPD is expected to take the place of the apparatus such as an image intensifier (hereinafter referred to as I.I.) and the like currently used as a moving image radiographing system.

In such an X-ray imaging apparatus, before irradiating the X-rays on the photoelectric conversion elements, there is an operation that irradiates light on the device in advance. Each photoelectric conversion element generates a charge that does not depend on the incidence of X-rays thereon, in addition to the charge generated by the incident X-rays. Hereinafter, an output of the charge generated independent of the incidence of X-rays is referred to as a dark signal. Further, according to the past history of the incident X-ray irradiation, a charge is generated with a delay from the photoelectric conversion element. Hereinafter, the output of such a charge generated with a delay is referred to as an image lag. These dark signals and image lags often produce a feeling of strangeness in viewing the output image, as they appear in the image as noise.

Hence, to inhibit the effect of such dark signals and image lag, there is an FPD disclosed in U.S. Pat. No. 5,905,772. In U.S. Pat. No. 5,905,772, there is disclosed a digital X-ray imaging apparatus including a bias radiation source (electromagnetic radiation source) that radiates on a semiconductor device by electromagnetic radiation. Before radiographing an object, the generation of the dark signals, the image lag, and the like is inhibited by irradiating a light on the photoelectric conversion elements. Here, the operation to irradiate light (electromagnetic irradiation) in advance is referred to as a light reset.

SUMMARY OF THE INVENTION

In the FPD, since a gain is different for each pixel, a correction operation that corrects for this gain difference for each pixel is required. As a cause for such differences in the gains for each pixel, there can be cited the existence of a distribution in the efficiency of converting X-rays into light inside the surface of the phosphor, and the existence of a distribution in the conversion efficiency of the conversion elements. Further, the existence of fluctuation in the capacitance of the conversion element and the wiring, and the existence of fluctuations in the amplification factor of the amplifiers of the signal processing circuit can be also cited as causes. Further, irradiation fluctuation of a radiation tube, transmission fluctuation of a grid, transmission fluctuation of a phototimer, and the like, can be also cited as causes. Due to the above-described causes, in an FPD that is different in gain for each pixel, even when an equal amount of light is incident on all the pixels of the FPD, the output changes for each pixel.

As a typical method of correcting for such differences in the gains of each pixel, there is a gain correction. This gain correction is a technique in which a signal output derived by irradiating X-rays from an X-ray source no object is present, is stored in a memory (the signal output derived at this time is hereinafter referred to as a gain correction image), and based on this gain correction image, the signal output at the time of radiophotographing an object is corrected. Based on this gain correction image, the signal output (radiation image) at the time of radiographing the object is corrected by the method of division and the like, so that non-uniformity of the signal output generated by fluctuation of the gain for each pixel can be removed. Consequently, by dividing the signal output (radiation image) at the time of radiographing the object by the gain correction image, the fluctuation of the signal output can be corrected. That is, when gain correction is used, it is possible to remove the effect due to the non-uniformity of various parameters. In particular, the fact that the effect due to irradiation fluctuation of the X-ray source can be removed by the gain correction is the advantage of the digital X-ray imaging apparatus such as the FPD and the like as compared to the imaging apparatus using the film.

However, with the FPD disclosed in U.S. Pat. No. 5,905,772, when the light reset is performed, it is very difficult to irradiate a uniform light on the entire surface of the sensor unit. Hence, in the signal output at the time of radiophotographing an object, a non-uniform signal output (apart from non-uniformities due to the presence of the object itself) may be generated. When the light amount irradiated in advance on the photoelectric conversion elements has a distribution inside the surface of the sensor unit, even if the amount of dark signals and of image lag is reduced, there is still a distribution of the generating amount that occurs in the surface of the sensor unit. Further, the sensitivity of the photoelectric conversion element for each pixel has the possibility of having a distribution. Hence, the signal output at the time of radiographing an object has the possibility of being affected by this distribution as an artifact. Further, even when light of equal amount enters each conversion element, due to fluctuation of the pixel size and the like of the conversion element, the dark signals or image lag that is generated has the possibility of having fluctuation for each pixel and distribution inside the surface of the sensor unit. Hence, the signal output at the time of radiophotographing an object has the possibility of being affected by this.

These distributions cannot be corrected in the above-described gain correction since they are not included in the above described gain-correction images. Consequently, when the light reset is performed, even if gain correction is performed, there is the possibility that a sense of strangeness may be produced in the images.

As described above, in U.S. Pat. No. 5,905,772, there has been a problem of not being able to perform gain correction adequately when the light reset is used. The present invention has been made in view of such problem, and an object of the invention is to be able to perform the gain correction adequately.

The radiation imaging apparatus of the present invention performs an operation to derive a signal based on radiation, and comprises a sensor unit for deriving the signal from the radiation, the sensor unit having a two-dimensional arrangement of pixels that each have a conversion element for converting the radiation into an electrical signal, a light source that emits light onto the conversion elements, and a correction unit that corrects an image signal derived by the sensor unit based on a correction signal for correcting different gains for each pixel, wherein the correction unit corrects the image signal derived by the sensor unit during operation, based on the correction signal derived by the sensor unit irradiated with light from the light source. Further, the correction unit corrects the image signal derived by the sensor unit not irradiated with light from the light source during the operation based on the correction signal derived by the sensor unit while not irradiated with the light from the light source.

A radiation imaging system of the present invention is characterized by comprising the radiation imaging apparatus, and the image output device that outputs an image based on the image signal subjected to gain correction by the radiation imaging apparatus.

A correction method of the radiation imaging apparatus of the present invention is a method comprising a sensor unit two-dimensionally disposed with the pixel having the conversion element that converts the radiation into an electrical signal and a light source that emits a light to the conversion element, and correcting the image signal derived by the sensor unit based on the correction signal for correcting the gain different for each pixel, wherein the radiation imaging apparatus performs an operation for deriving the signal from the radiation, and the image signal derived by the detection unit radiated with the light from the light source during the operation is corrected based on the correction signal derived by the detection unit irradiated with the light from the light source during the operation. Further, the image signal derived by the detection unit not irradiated with the light from the light source during the operation is corrected based on a correction signal derived by the detection unit not irradiated with the light from the light source during the operation.

According to the present invention, gain correction can be performed based on the data (image signal) of the radiation image outputted from the sensor unit after the light not including image information is irradiated and the data of the gain correction image adaptable to each of the data of the radiation image outputted from the sensor unit without being irradiated with the light not including the image information. As a result, a gain correction image that can perform an appropriate gain correction according to the radiographing condition can be provided.

Further features of the present invention will become apparent from the following description of exemplary embodiments (with reference to the attached drawings).

DESCRIPTION OF THE EMBODIMENTS

Incidentally, in the embodiments of the present invention, while the embodiments using X-rays as radiation are shown, the radiation used in the present invention is not limited to X-rays, but also includes electromagnetic waves and particle beams such as α-rays, β-rays, γ-rays and the like.

First Embodiment

Figure 1:
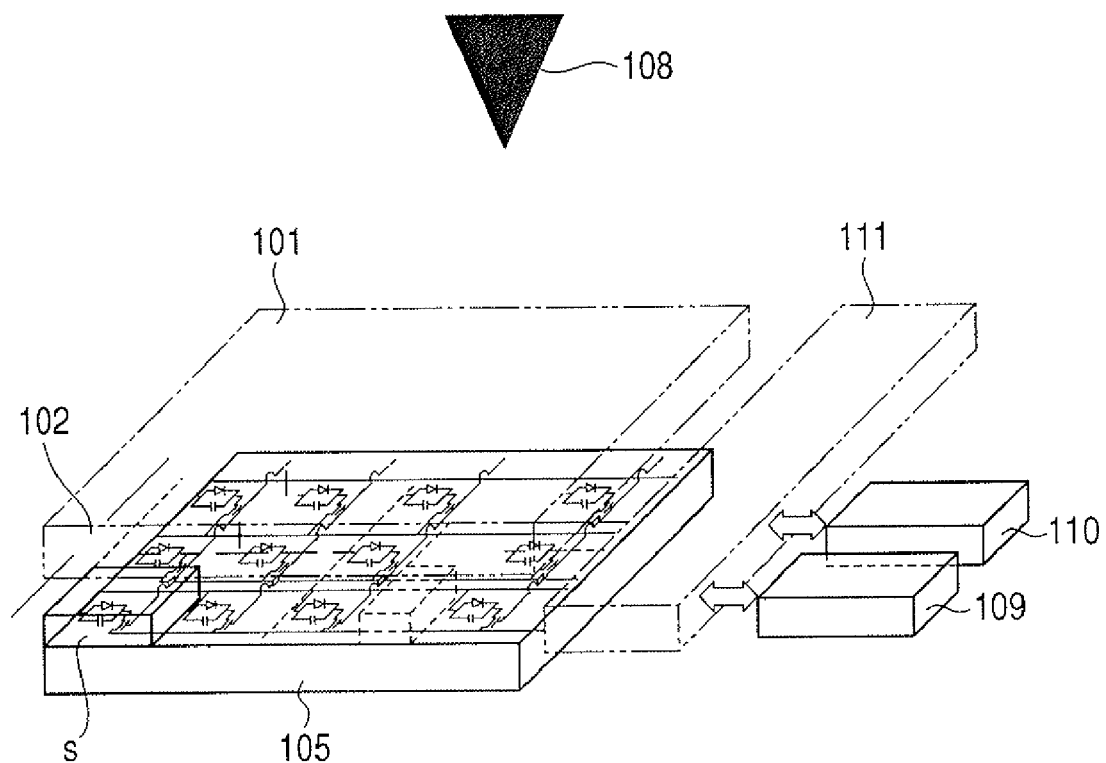
FIG. 1 shows a first embodiment of the present invention, and is a view showing one example of the configuration of a radiation imaging apparatus (FPD).

Hereinafter, with reference to the drawings, a first embodiment of the present invention will be described. FIG. 1 is a view showing one example of the configuration of a radiation imaging apparatus of the present embodiment. Incidentally, in the present embodiment, description will be made with reference to the case where the radiation imaging apparatus is an FPD.

In FIG. 1, the FPD has a phosphor 101 that converts X-rays, which are one example of a type of radiation, into light. This phosphor 101 has any one of, for example, $Cd_2O_3$, $Cd_2O_2S$, and CsI as a main ingredient.

Further, the FPD has a sensor unit sensor unit 102 configured such that a plurality of photoelectric conversion elements S11 to S33 for converting light into an electrical signal are disposed in a matrix pattern on an insulating substrate having a light transmission property. Incidentally, in FIG. 2, the number of photoelectric conversion elements S provided in the sensor unit 102 is nine. However, in reality, the photoelectric conversion elements are provided in greater number. For example, in the case of the FPD of approximately 40 cm square, the photoelectric conversion elements number approximately 2000×2000 (=4000000).

Figure 3:
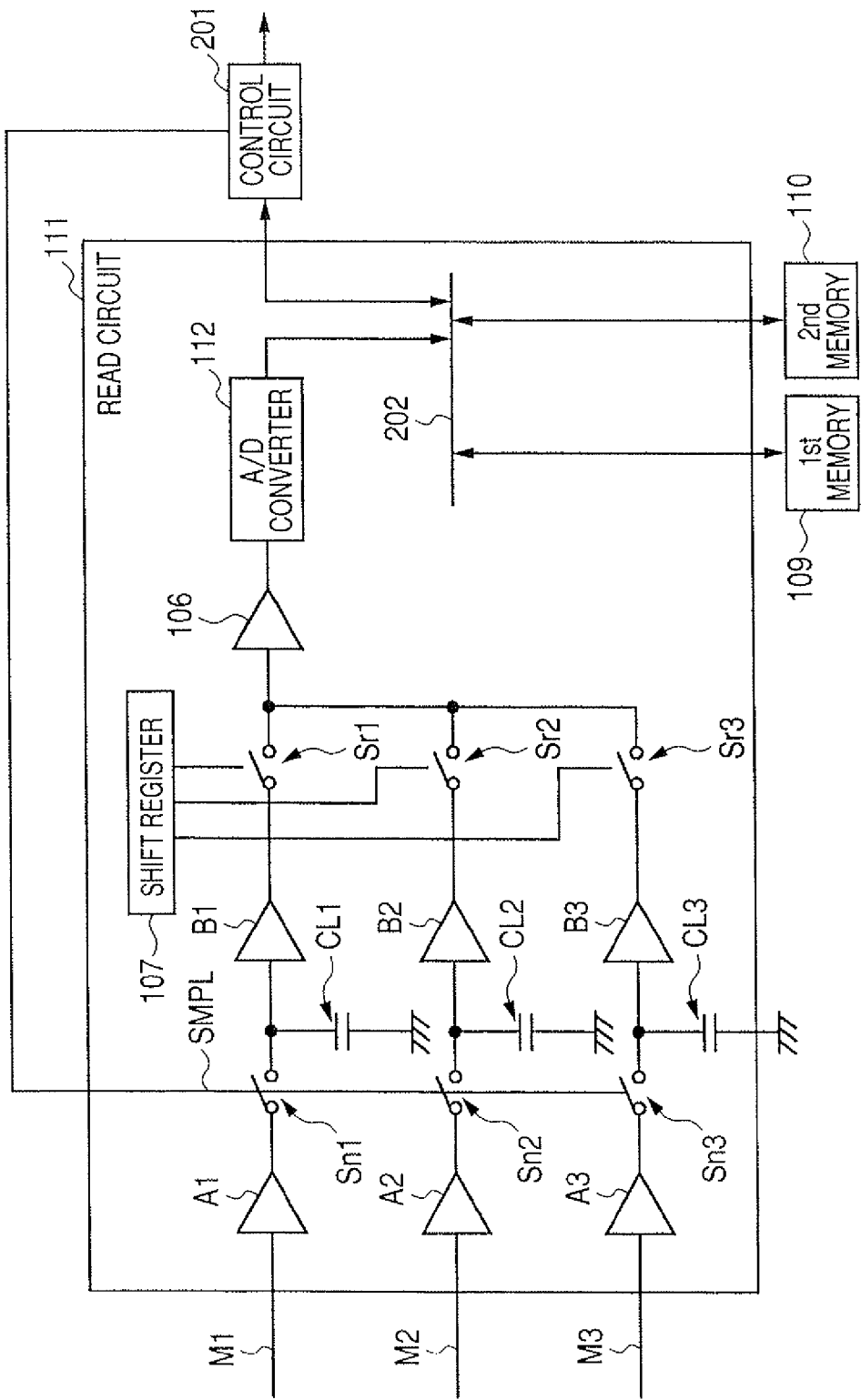
FIG. 3 shows the first embodiment of the present invention, and is a view showing one example of the detail of a signal processing circuit.

Further, the FPD has a signal processing circuit 111 that reads the electrical signal derived by a sensor unit S (see FIG. 3). Further, from among the rear surface of the sensor unit 102, in the surface facing an X-ray source 108, there is provided a light source 105. In the FPD of the present embodiment, a first memory 109 and a second memory 110 capable of recording the output of the signal processing circuit 111 are connected to the signal processing circuit 111. Here, as the first memory 109 and the second memory 110, it is preferable to use a read/writable recording medium such as a flash memory, HDD (hard disk drive), and the like. Incidentally, in FIG. 1, to describe the photoelectric conversion element S, the phosphor 101 is shown positioned in midair above the sensor unit 102, but in reality, the phosphor 101 is adhered on the sensor unit 102.

Here, next, one example of the operation of the FPD will be described with reference to the case where the X-rays are irradiated and the reading of the signal is performed at the time of deriving the gain correction image. First, referring to FIGS. 1 to 4, one example of the operation of the FPD in the case where X-rays are irradiated from an X-ray source 108 and the reading of the signal output is performed will be described.

First, the X-rays irradiated from the X-ray source 108 are converted into light (for example, visible light) by the phosphor 101. The converted light enters the sensor unit 102. The light is converted into charge by the photoelectric conversion elements S11 to S33 comprising PIN diodes formed based on a-Si, and this charge is accumulated on the spot until it is read. Incidentally, the X-ray source 108 can irradiate X-rays continuously, or can continuously irradiate X-rays having a pulse waveform. Which type of X-ray beam should be irradiated may be decided based on the operation of an operation key of the FPD by the user.

Figure 2:
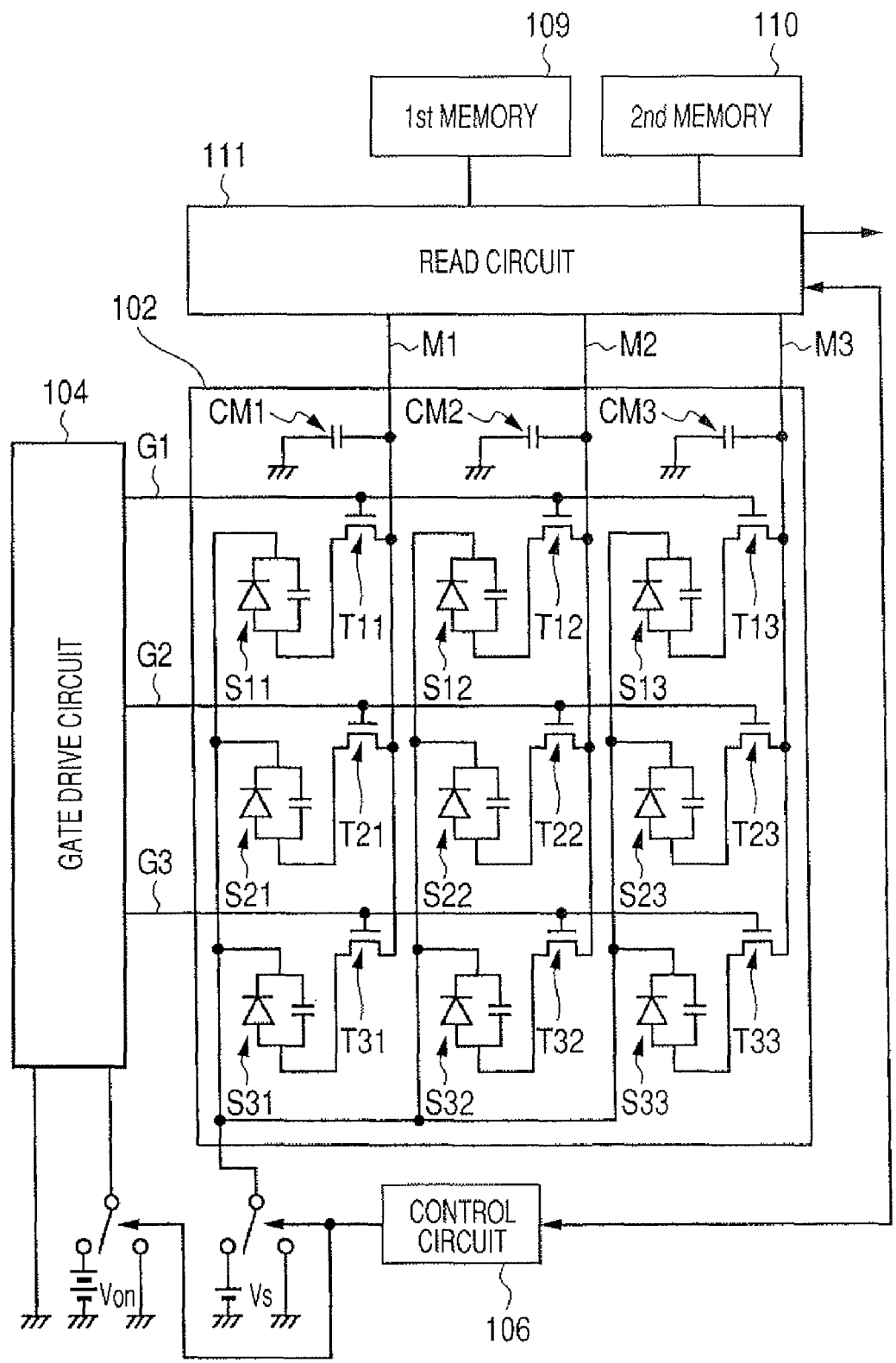
FIG. 2 shows the first embodiment of the present invention, and is a view showing one example of the detail of a sensor unit.

In FIG. 2, a control circuit 201 is shown, for managing and controlling the operation of the FPD. The control circuit 201 of the present embodiment comprises a micro-computer comprising a CPU, a ROM storing a control program for controlling the FPD and the like, and a RAM that becomes a work area and the like when the CPU executes the control program stored in the ROM. Further, in the present embodiment, the control circuit 201, the first memory 109, the second memory 110, and an A/D converter 112 are mutually connected through a communication bus 202. A sequence of reading signal charges accumulated in each of the photoelectric conversion elements S11 to S33 is decided by a control through gate lines G1 to G3 by a gate drive circuit 104 comprising a shift register. Here, the reading of the charges is performed in order of the photoelectric conversion elements S11 to S13 disposed in the first line, the photoelectric conversion elements S21 to S23 disposed in the second line, and the photoelectric conversion elements S31 to S33 disposed in the third line.

To perform the reading of electrical signals based on the charges accumulated in the photoelectric conversion elements S11 to S13 disposed in the first line, a gate line G1 of switch elements T11 to T13 mutually connected in series is given a gate pulse from a shift register 1104 inside a gate drive circuit 104. As a result, the switches T11 to T13 are put into a turned-on state, and the electrical signals based on the charges accumulated in the photoelectric conversion elements S11 to S13 are transferred to signal lines M1 to M3, respectively.

The electrical signals transferred to the signal lines M1 to M3 are transferred to reading capacitors CM1 to CM3 through the switch elements T11 to T13, respectively. The electrical signals transferred to the reading capacitors CM1 to CM3 are sent to a signal processing circuit 111 of FIG. 3. The electrical signals inputted to the signal processing circuit 111 are amplified by amplifiers A1 to A3, and after that, are transferred to capacitors CL1 to CL3. Here, when the control circuit 201 turns off an SMPL signal so that switches Sn1 to Sn3 are disconnected, the electrical signals are held in the capacitors CL1 to CL3. Next, a shift register 107 applies a pulse to switches Sr1 to Sr3 in order of the switches Sr1, Sr2*m* and Sr3. Then, the electrical signals held in the capacitors CL1 to CL3 are outputted in order of the capacitors CL1, CL2, and CL3 to the A/D converter 112 through amplifiers B1 to B3, the switches Sr1 to Sr3, and an amplifier 106.

At this time, since analogue electrical signals are outputted from the amplifiers B1 to B3, as described above, inclusive of the shift register 107 and the switches Sr1 to Sr3, all are referred to together as an analogue multiplexer. As a result, the signals of the first line of the photoelectric conversion elements S11 to S13 shown in FIG. 2 are sent in order to the A/D converter 112 by the analogue multiplexer, and are converted into digital data.

The reading operation of the signals based on the charges accumulated in the photoelectric conversion elements S21 to S23 disposed in the second line and the photoelectric conversion elements S31 to S33 disposed in the third line is also performed similarly to the reading operation of the signals of the photoelectric conversion elements S11 to S13 disposed in the first line. In the FPD as described above, after performing the operation to remove the charges remaining in each of the capacities CM1 to CM3 and CL1 to CL3, the reading operation is repeated, so that the radiographing of the moving images is performed. In the following description, the operation to remove the charges remaining in each of the capacitors CM1 to CM3 and CL1 to CL3 is referred to as an electrical reset.

Here, the reading operation of the FPD that obtains the gain correction image is the same as the reading operation of the FPD that obtains the radiation image of an object, except that in the former no object is present between the X-ray source 108 and the sensor unit 102 (including the phosphor 101 also). That is, the operation of the radiation imaging system that obtains the X-ray image is an operation that obtains the X-ray image of the object by converting the X-rays that have passed through the object after being radiated from the radiation source 108 into electrical signals by the FPD in a state in which the object is present between the X-ray source 108 and the sensor unit 102. On the other hand, the operation of the radiation imaging system that obtains the gain correction image is an operation that obtains an X-ray image by converting the X-rays radiated from the radiation source into electrical signals by the FPD in a state in which no object is present between the X-ray source 108 and the sensor unit 102.

By the above-described operation, without irradiating light in advance on the photoelectric conversion elements S11 to S33 from the light source 105, by converting X-rays radiated from the radiation source 108 into electrical signals by the FPD and deriving the X-ray image in a state in which no object is present between the X-ray source 108 and the sensor unit 102, a signal output of the gain correction image can be read in a state in which no light reset is performed. Incidentally, in the following, this signal output is referred to as a gain correction image XRc2, according to needs. The control circuit 201 stores the read gain correction image XRc2 in the second memory 110.

Next, to subtract a fixed pattern noise (hereinafter referred to as an FPN) included in the derived gain correction image XRc2, the FPN is measured. In the reading-out operation of the signal, by performing the reading operation of the signal charge without performing radiation of the X-rays, the FPN can be derived. The control circuit 201 subtracts the FPN derived in this fashion from the gain correction image XRc2 stored in the second memory 110, and the gain correction image XRc2 less the FPN is stored in the memory 110.

Incidentally, a subtracting circuit is provided in the control circuit 201, and based on the subtracting circuit, the FPN may be subtracted from the gain correction image XRc2, or alternatively by using software executed by the CPU of the control circuit 201, the FPN may be subtracted from the gain correction image XRc2. Further, the gain correction image XRc2 may first be derived and after that the FPN may be derived, but the opposite order, deriving the FPN before deriving the gain correction image XRc2 by irradiating the X-rays, may be used.

Similarly, after irradiating on the photoelectric conversion elements S11 to S33 from the light source 105 in advance and performing the light reset, the same operation to derive the above-described gain correction image is performed. As a result, the signal output of the gain correction image in a state in which the light reset is performed can be read. Incidentally, in the following, this signal output is referred to as a gain correction image XRc1. The control unit 201 stores the read gain correction image XRc1 in the first memory 109. The light emitted from the light source 105 is desirable to be uniformly incident on the sensor unit 102. Hence, the gain correction image XRc1 also, similarly to the gain correction image XRc2, is overwritten and stored in the first memory 109 after the FPN is subtracted therefrom.

As described above, when the light reset is performed once, in the photoelectric conversion element which is a sensor, the distribution of the intensity (the number of photons) or luminous wavelength (energy) inside the surface of the sensor unit 102 of the light incident on the sensor unit 102 is likely generated at the time of the light reset. Further, when light of quite uniform amount (the number of photons) and quality (energy per photon) enters the sensor unit 102, the image lag or noise generated in each of the photoelectric conversion elements 102 can likely still generate a distribution inside the surface of the sensor unit 102.

Hence, it is desirable that the light reset is performed to derive the gain correction image XRc1 after deriving the gain correction image XRc2 in a state in which no light reset is performed. Incidentally, in the present embodiment, based on the operation of the operation key of the FPD by the user, it is possible to designate the gain correction images XRc1 and XRc2 and which gain correction image XRc1 or XRc2 should be derived.

Figure 4:
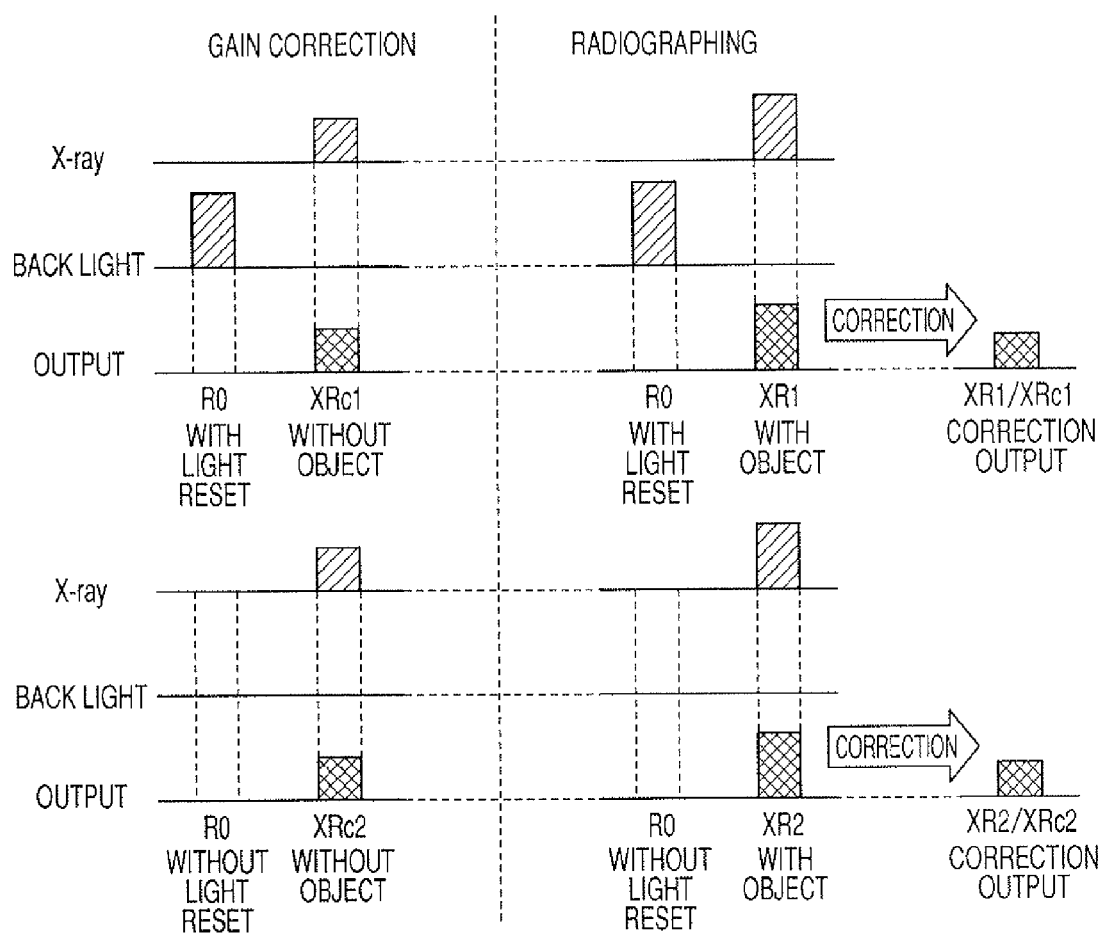
FIG. 4 shows the first embodiment of the present invention, and is a view conceptually showing one example of the correction of a radiation image performed based on a gain correction image.

FIG. 4 is a view conceptually showing one example of a correction of the radiation image performed by using the gain correction images XRc1 and XRc2 derived as described above. In FIG. 4, when the X-ray radiographing is performed after performing a light reset R0 (upper row of FIG. 4), based on the gain correction image XRc1 derived in a state in which the light reset R0 is performed, a gain correction of the derived imaging image is performed.

On the other hand, when the X-ray radiographing is performed without performing the light reset R0 (lower row of FIG. 4), based on the gain correction image XRc2 derived in a state in which the light reset R0 is not performed, the gain correction of the derived radiation image is performed. By so doing as described above, the present embodiment performs the light reset, and properly uses the gain corrections XRc1 and XRc2 by a mode for radiographing the object and by a mode for radiographing the object without performing the light reset. Incidentally, when X-rays are continuously irradiated from the X-ray source 108, it is preferable that the gain correction of the derived radiophotographed image is also continuously performed. On the other hand, when X-rays having a pulse waveform are irradiated from the X-ray source 108, it is preferable that the gain correction of the radiation image is performed in conformity to the waveform.

Figure 5:
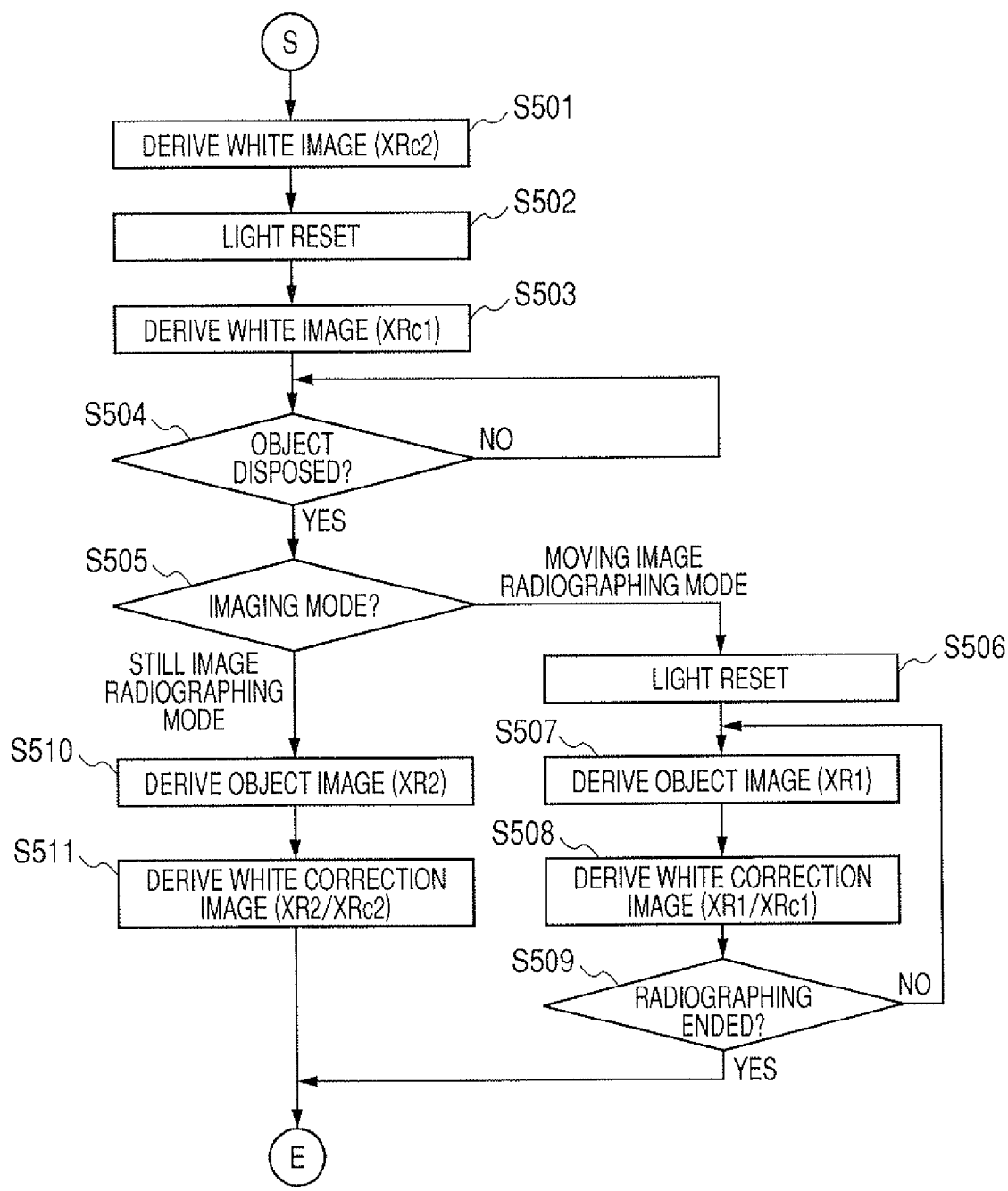
FIG. 5 shows the first embodiment of the present invention, and is a flowchart to explain one example of the operation of the radiation imaging apparatus (FPD).

Next, referring to the flowchart of FIG. 5, one example of the operation of the FPD of the present embodiment will be described. As described above, the FPD of the present embodiment comprises the first mode for radiographing the object by performing light reset and the second mode for radiographing the object without performing light reset. For example, when the radiographing of the moving image such as fluoroscopic radiography is performed, the first mode for performing the radiographing is adapted after performing the light rest in order to reduce the image lag, and when the radiographing of still images, such as plain radiography, is performed, the second mode for performing the radiographing by omitting the light reset is adopted. Incidentally, in the following description, the first mode is referred to as a moving image radiographing mode, and the second mode referred to as a still image radiographing mode.

First, as described above, the gain correction image XRc2 is derived without performing the light reset, and at the same time, when the FPN is derived, the control circuit 201 subtracts the FPN from the gain correction image XRc2, and the gain correction image XRc2 less the FPN is stored in the second memory 110 (step S501). Next, the light reset is performed (step S502). Then, as described above, the gain correction image XRc1 is derived, and at the same time, when the FPN is derived, the control circuit 201 subtracts the FPN from the gain correction image XRc1, and the gain correction image XRc1 less the FPN is stored in the first memory 109 (step S503). Here, in the present embodiment, although the gain correction image XRc2 and the gain correction image XRc1 are continuously derived, the present invention is not limited to this. It does not matter even if a power source of the FPD is cut off between steps S501 and S502. Further, it does not matter even if a power source of the FPD is cut off after step S503.

Next, the control circuit 201 waits until the object is disposed in the FDP (step S504). Here, when the power source of the FDP is turned off after step S503, in step S504, the control circuit 201 waits until the object is disposed in the FPD after the power source is inputted to the FPD. Next, the control circuit 201, based on the operation of the operation key of the FPD by the user, determines whether the radiographing mode is the moving image radiographing mode or the still image radiographing mode (step S505). As a result of this determination, when the selected mode is the moving image photographing mode, the light reset is performed (step S506). After that, the control circuit 201 instructs the X-ray source 108 to irradiate the X-rays and perform the radiophotographing of the object. Then, the control circuit 201 derives a signal output (image signal) XR1 showing the object image radiographed based on this instruction, and at the same time, derives the FPN. Incidentally, to approximate the radiographing condition to the time when the gain correction image XRc1 is derived, the timing from performing the light reset until performing radiation of the X-rays should preferably be the same as the timing when the gain correction image XRc1 is derived. The control circuit 201 subtracts the FPN from the signal output XR1 (step S507). Incidentally, at such a moving image radiographing time, the control circuit 201 keeps the sensor bias potential voltage Vs and the switch elements T11 to T33 in an on-potential.

Next, the control circuit 201 divides the signal output XR1 from which the FPN is subtracted in the above-described manner by the gain correction image XRc1 stored in the first memory 109 so as to perform the gain correction, thereby deriving a signal output (=XR1/XRc1) showing the gain-corrected image (step S508). The control circuit 201, based on the operation of the operation key of the FPD by the user, determines whether the radiographing is completed or not (step S509). As a result of this determination, when the radiographing is not yet completed, steps S507 to S509 are repeatedly performed until the radiographing is completed.

As described above, the radiographing of the moving image is achieved by continuously repeating the reading operation after the light reset is performed once before starting the radiographing and an electrical reset. At this time, the signal output XR1 of the derived moving image is corrected as needed based on the gain correction image XRc1.

At step S505, when the selected mode is the still image radiographing mode, the control circuit 201 instructs the X-ray source 108 to irradiate the X-rays and perform the radiographing of the object. At this time, no light reset is performed. The control circuit 201 derives a signal output (image signal) XR2 showing the object image radiographed based on this instruction, and at the same time, derives the FPN. The control circuit 201 subtracts the FPN from the signal output XR2 (step S510). Incidentally, at such still image radiographing mode time, the control circuit 201 changes the sensor bias potential Vs and the switch elements T11 to T33 from the on-potential to an off-potential (for example, a GND potential) for a constant period for every one frame that is radiographed (see FIG. 2). That is, during the radiographing of every still-image frame, various potentials applied to the sensor unit 102 become off-potential (for example, GND potential) for a constant period.

Next, the control circuit 201 divides the signal output XR2 from which the FPN is subtracted as described above by the gain correction image XRc2 stored in the second memory 110 so as to perform the gain correction, thereby deriving a signal output (=XR2/XRc2) showing the gain-corrected image (step S511).

As described above, the FPD in the present embodiment mainly has the following characteristics.

There are the first mode (for example, the moving image radiographing mode) performed with a light reset and the second mode (for example, the still image radiographing mode) performed without a light reset, and these modes can be selected by the user at the radiographing time. Similarly to the gain correction image XRc1 derived after performing the light reset and the gain correction image XRc2 acquired without performing the light reset, gain correction images of two or more types are generated and stored in the memory depending on the presence or absence of the light reset.

When the light reset is performed in a case where an object is radiographed, the gain correction of the object image is performed based on the gain correction image (for example, the gain correction image XRc1) derived after performing the light reset. On the other hand, when the light reset is not performed in radiographing the object, the gain correction of the object image is performed based on the gain correction image (for example, the gain correction image XRc2) derived without performing the light reset.

As described above, in the present embodiment, gain correction images of more than two types are generated according to the presence or absence of the light reset, and one of the generated gain correction images is selected according to the radiographing mode, and based on the selected gain correction image, the gain correction of the object image is performed, and therefore, such gain correction is advantageous as compared to gain correction performed based on a gain correction image of only one type. For example, when the light reset is performed in advance so as to derive the gain correction image XRc1 only, and the signal output is corrected based on the gain correction image XRc1 regardless of the presence or absence of the light rest, in a case where the gain correction of the signal output (image radiographing signal for moving image) XR1 derived by performing the light reset is performed, a correction value (XR1/XRc1) is obtained. Similarly, based on the gain correction image XRc1, when gain correction of the signal output (still image) XR2 derived without performing the light reset is performed, a correction value (XR2/XRc1) is obtained. Then, it is clear that, in the case of the correction value for the signal output (image radiographing signal for a still image) XR2, no correction of the gain distribution for each pixel by the above-described light irradiation is performed.

Similarly, even when the gain correction image XRc2 only is derived without performing the light reset in advance and the signal output is corrected based on the gain correction image XRc2 regardless of the present or absence of the light reset, the above-described correction is not performed in the case of the correction value (XR1/XRc2) for the signal output (moving image) XR1. In contrast to this, in the present embodiment, according to the presence or absence of the light reset when radiographing the object, much suitable gain correction image is selected. Hence, it is possible to perform a correction of the gain distribution for each pixel by the light irradiation due to the distribution of the light source 105 and the amount of dark signal or image lag generated inside the surface of the sensor unit 102.

Incidentally, in the present embodiment, though the light reset is performed in the moving image radiographing mode and is not performed in the still image radiographing mode, it is not necessary to operate in such a manner. Instead, the light rest may be performed in the still image radiographing mode, and not be performed in the moving image radiographing mode. When the moving image is radiographed without performing the light reset, then based on the gain correction image XRc1 stored in the memory 109, the gain correction is performed. Similarly, when the still image is radiographed based on the light rest, then based on the gain correction imager XRc1 stored in the memory 110, the gain is corrected.

Further, in the present embodiment, while description has been made with reference to an example cited on the case where the photoelectric conversion element is a PIN diode formed by a-Si, for example, the photoelectric conversion element may be a MIS-type photoelectric conversion element and the like. Further, instead of the phosphor 101 and the photoelectric conversion element, an element that converts the radiation (X-rays) directly into charge can be used.

Further, for example, if a material of cadmium system is used as a main ingredient material, $Cd_2O_3$ and $Cd_2O_2S$ are not necessarily used as a main ingredient material of the phosphor 101.

Further, the TFT configuring the switch elements T11 to T33 may be formed based on polysilicon or organic materials in addition to amorphous silicon. Further, in the present embodiment, although the gate drive circuit 104 is configured based on an integrated circuit of crystal silicon, the gate drive circuit 104 may comprise a shift register using amorphous silicon or polysilicon as a material. If the configuration is set up in such a manner, there is no need to provide the gate drive circuit 104 as a separate entity, and this can achieve the effect of reducing the cost and the like.

Further, in the present embodiment, though a description has been made on the basis of radiation with X-rays as an example, the radiation used is not limited to X-rays.

Further, in the present embodiment, although the gain correction images Xc1 and Xc2 are stored in separate memories (the first memory 109 and the second memory 110), respectively, needless to mention, these gain correction images Xc1 and Xc2 may be stored in one memory.

Further, in the present embodiment, though the light source 105 irradiating visible light has been used, the present invention is not limited to this. It is only necessary that electromagnetic waves of a waveband perceptible by the sensor unit 102 are irradiated on the sensor unit 102, and for example, in place of the light source 105, X-ray irradiation by the X-ray source 108 and the luminance by the phosphor 101 may be used. However, in this case, when the light reset is performed, if the object is placed between the FPD and the X-ray source 108, sufficient irradiation is not performed, and moreover, excessive irradiation of the X-rays on the object creates a problem. Hence, when the light reset is performed based on X-ray irradiation and the luminance by the phosphor 101, it is preferable that no object is placed between the FPD and the X-ray source 108.

Figure 6:
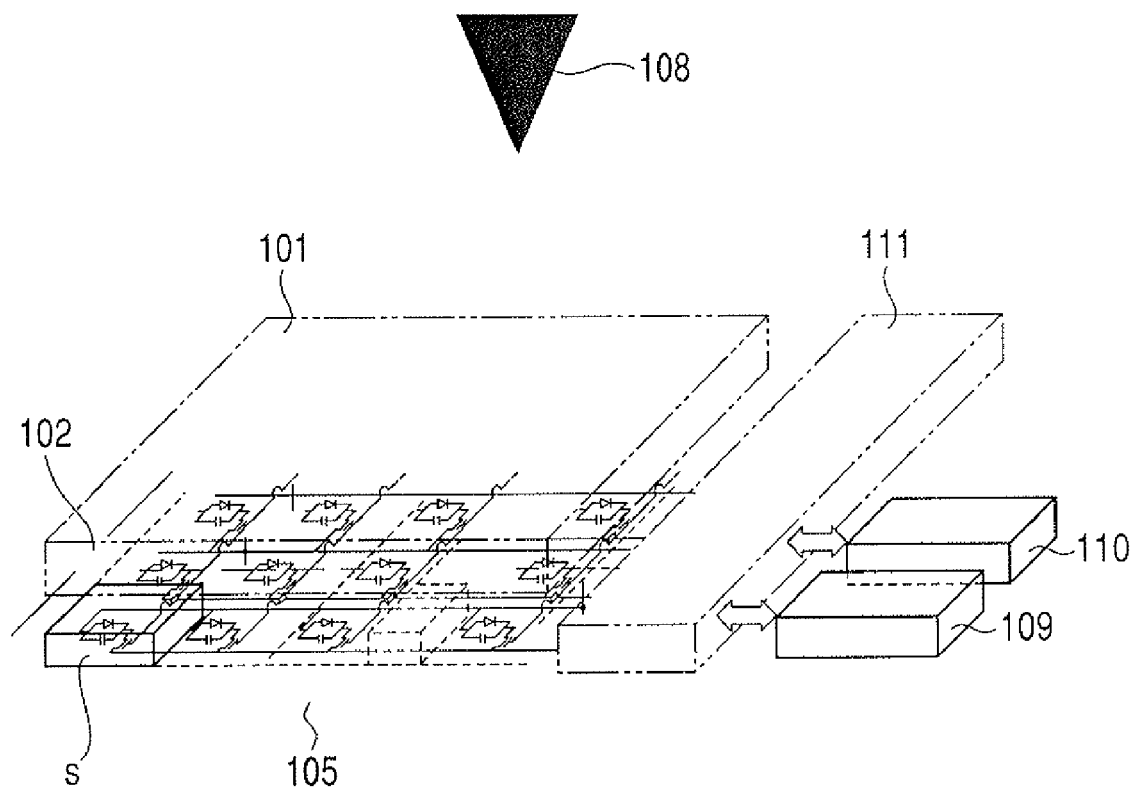
FIG. 6 shows a second embodiment of the present invention, and a view to explain one example of a configuration of the radiation imaging apparatus (FPD).
Figure 7:
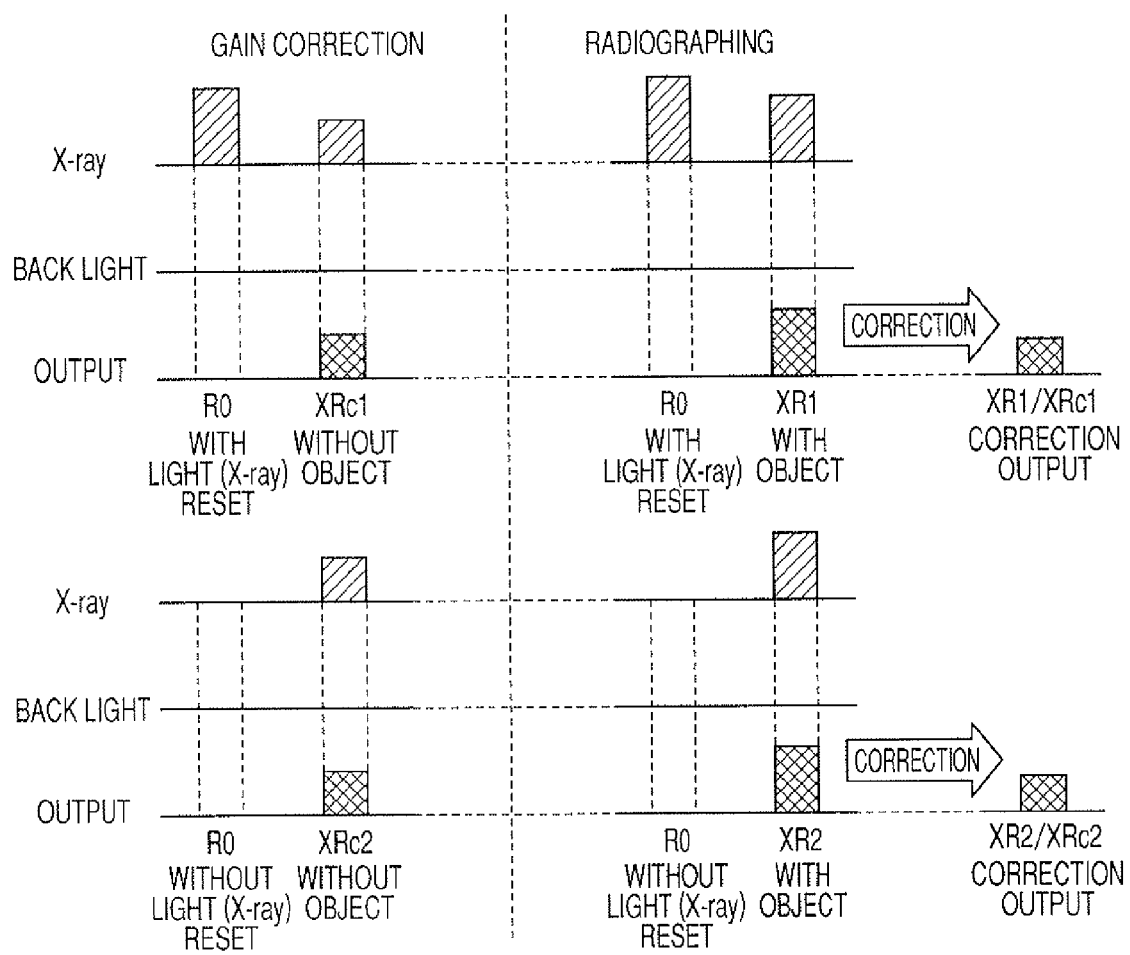
FIG. 7 shows a second embodiment of the present invention, and a view conceptually showing one example of the correction of the radiation image performed based on the gain correction image.

FIG. 6 is a view showing an example using X-ray irradiation by the X-ray source 108 in place of the light source 105, and the luminance by the phosphor 101. Here also, a description will be made with an example based on a case where the irradiating imaging apparatus is the FPD. Further, FIG. 7 is a view conceptually showing one example of the correction of the radiation image performed based on the gain correction images XRc1 and XRc2.

The luminance performed in the phosphor 101 by irradiating X-rays from the X-ray source 108 can be expected to provide almost the same effect as the light reset using irradiation of light in advance from the light source 105 shown in FIG. 1. As shown in FIG. 7, in the present embodiment, the gain correction image XRc1 derived by irradiating X-rays from the X-ray source 108 is stored in the first memory 109. In this case, the amount of the luminance performed in the phosphor 101 by being irradiated with X-rays from the X-ray source 108 should desirably be equal to the amount of the luminance of the light reset using the light source 105 in the first embodiment. Further, in a state in which there is no irradiation of X-rays from the X-ray source 108, or after a sufficiently long period of time elapses after the irradiation of X-rays from the X-ray source 108, the gain correction image XRc2 is derived without performing light reset.

In the present embodiment also, the signal output (for example, the image signal for moving image) XR1 derived based on the light reset is corrected based on the gain correction image XRc1, and a correction value (XRc1/XR1) is derived. Further, the signal output (for example, the image signal for still image) XR2 derived without using the light reset is corrected based on the gain correction image XRc2, and a correction value (XRc2/XR2) is derived. As described above, there is no need to provide the light source 105 in an apparatus that uses X-rays irradiation by the X-ray source 108 and the luminance by the phosphor 101 for the light reset, and this can achieve an effect of reducing the size and cost of the apparatus much further.

Figure 8:
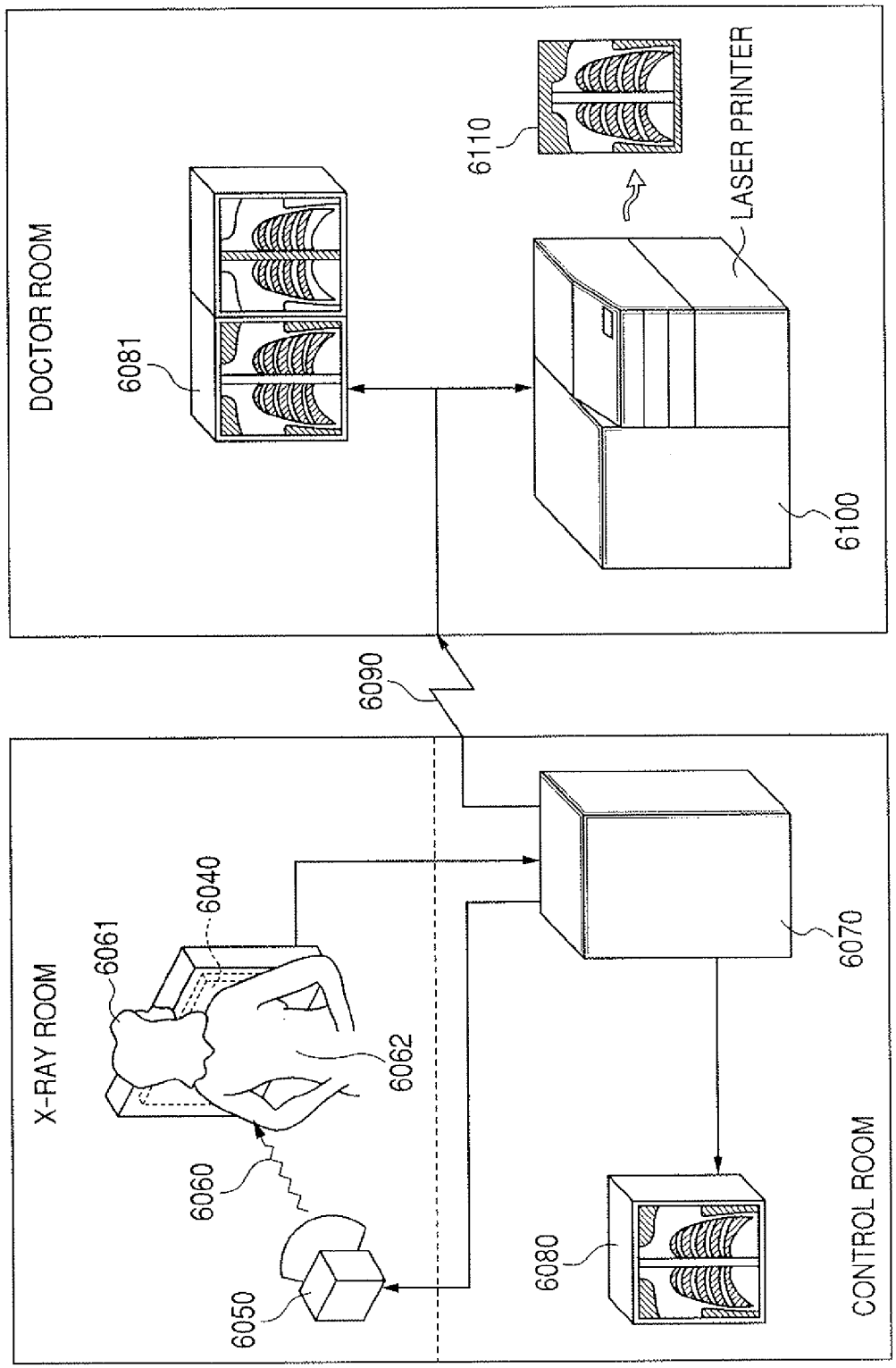
FIG. 8 shows the embodiments of the present invention, and is a view showing one example of the configuration of a radiographing control radiographing system using the radiation imaging apparatus.

Incidentally, the radiation imaging apparatus of each embodiment as described above can be adapted to an imaging system as shown in FIG. 8. FIG. 8 is a view showing one example of the configuration of the imaging system using the radiation imaging apparatus.

In FIG. 8, an image processor 6070 is provided with the above described gain correction functions. The characteristics of the imaging system of the present embodiment are that the object is provided with the radiation imaging apparatus that irradiates the X-ray, and moreover, the control circuit 201 provided in the image processor 6070 is configured to be able to control the operation of the radiation imaging apparatus.

Incidentally, the image processor 6070, for example, comprises the above described microcomputer, calculation circuits of various types, and a write/readable storage medium such as HDD and flush memory and the like. As shown in FIG. 3 and the like, the correction values (XR1/XRc1 and XR2/XRc2) outputted from the control circuit 201 are outputted, for example, to a display 6081 as images.

The operation of such imaging system will be described below. X-rays 6060 generated by an X-ray tube 6050 as an X-ray generating source are transmitted through an object being observed 6062, such a chest or the like of a patient or a subject 6061, and is incident on an image sensor 6040. These incident X-rays include information on the inside of the subject 6061. Corresponding to the incidence of the X-rays, the image sensor 6040 derives electrical information. This information is converted into digital signals, and is subjected to image processing by the image processor 6070, and can be observed by a display 6080 located at a control chamber (control room).

Further, the information subjected to the image processing in this manner can be transmitted to remote location and the like by transmission means such as a telephone line or a wireless transmission 6090, and can be displayed in a display 6081, and is outputted to a film and the like, so that a doctor who is in a remote location such as a doctor's office at a different place from the control room can make a diagnosis on it. The information thus acquired in the doctor's office can be recorded or stored in the recording medium using the recording materials of various types such as an optical disk, magnetic optical disk, magnetic disk and the like or a recording medium 6110 using a film or paper and the like by recording means 6100 such as a film and the like.

Other Embodiments of the Present Invention

In order to allow devices of various types to operate in order to realize the functions of the above described embodiment, a program code of the software to realize the functions of the embodiment may be provided for the apparatus connected to the various devices or the computer inside the system. An embodiment executed by allowing the various devices to operate according to the program stored in the system or the computer (CPU or MPU) of the system is also included in the scope of the present invention.

Further, in this case, the program code itself of the above described software realizes the functions of the above described embodiment. Further, the program code itself and means for providing the program code to the computer, for example, the recording medium storing such program code configure the present invention. As the recording medium storing such a program code, for example, a flexible disk, hard disk, optical disk, magnetic optical disk, CD-ROM, magnetic tape, non-volatile memory card, ROM and the like can be cited.

Needless to mention, with the provided program code executed by the computer, not only the functions of the above described embodiment is realized, but, when the functions of the above described embodiment are realized in corroboration with the operation system in which the program code operates in the computer or other application soft and the like, such a program code is also included in the embodiment of the present invention.

Further, after the provided program code is stored in the memory provided for the feature extension board of the computer, a CPU provided for the feature extension board performs a part or the whole of the actual processing based on the instruction from the program code. By such processing, even when the functions of the above-described embodiment are realized, needless to mention, they are included in the present invention. Further, after the provided program code is stored in the memory provided for the feature expansion unit connected to the computer, the CPU and the like provided for the feature expansion unit performs a part or the whole of the actual processing based on the instruction from the program code. By such processing, even when the functions of the above described embodiment are realized, needless to mention, they are included in the present invention.

Incidentally, each of the above-described embodiments shows only a specific embodiment in carrying out the present invention, and it should not be construed that the technical scope of the present invention is limited by these embodiments. That is, the present invention can be executed in various forms without deviating from its main technical concept or characteristics.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A correction method of a radiation imaging apparatus, the apparatus comprising a sensor unit two-dimensionally disposed with pixels each having a conversion element that converts radiation into an electrical signal, a light source that emits light of a waveband perceptible by the conversion elements to the conversion elements, and a correction unit that corrects a radiation image of an object irradiated by radiation from a radiation source derived by the sensor unit based on a correction signal for correcting for different gains of the pixels, the correction method comprising:

a first deriving step, of the sensor unit deriving a first radiation image of an object, the sensor unit having been irradiated by the light from the light source before said first deriving step;

a second deriving step, of the sensor unit deriving a second radiation image of an object, the sensor unit without having been irradiated by the light from the light source before said second deriving step; and a correcting step, of the correction unit correcting the first radiation image of an object or the second radiation image of an object based on a correction signal, wherein the correction signal comprises a first correction signal derived by the sensor unit when the sensor unit is irradiated by radiation with no object present between the radiation source and the sensor unit after the sensor unit is irradiated by the light from the light source, and a second correction signal derived by the sensor unit when the sensor unit is irradiated by radiation with no object present between the radiation source and the sensor unit without having been irradiated by the light from the light source, and wherein, if the first radiation image of an object is corrected in the correcting step, the correction unit corrects the first radiation image of an object based on the first correction signal, and if the second radiation image of an object is corrected in the correcting step, the correction unit corrects the second radiation image of an object based on the second correction signal.

* * * * *